(12) United States Patent
Huang

(10) Patent No.: US 7,437,845 B2
(45) Date of Patent: Oct. 21, 2008

(54) FOLDABLE CAUTION DEVICE WITH BAG

(76) Inventor: Sunny en Liung Huang, 786 Via Monte Video St., Claremont, CA (US) 91711

( * ) Notice: Subject to any disclaimer, the term of this patent is extended or adjusted under 35 U.S.C. 154(b) by 16 days.

(21) Appl. No.: 11/803,205

(22) Filed: May 14, 2007

(65) Prior Publication Data

US 2007/0214694 A1 Sep. 20, 2007

Related U.S. Application Data

(63) Continuation-in-part of application No. 10/804,703, filed on Mar. 19, 2004, now abandoned, which is a continuation-in-part of application No. 10/449,681, filed on Jun. 2, 2003, now Pat. No. 6,928,951.

(51) Int. Cl.
*E01F 9/00* (2006.01)
*G09F 13/16* (2006.01)

(52) U.S. Cl. .................. 40/610; 40/903; 116/63 T; 116/63 P

(58) Field of Classification Search ............ 40/903, 40/603, 604, 610, 904; 116/63 T, 63 P, 63 C
See application file for complete search history.

(56) References Cited

U.S. PATENT DOCUMENTS 3,092,223 A * 6/1963 Martin ..................... 190/1
3,734,595 A 5/1973 Bendzick
3,742,897 A 7/1973 Meek
4,426,801 A 1/1984 Gates
4,462,145 A 7/1984 Schulze
4,607,444 A 8/1986 Foster
5,199,375 A 4/1993 Johson
5,452,934 A 9/1995 Zheng
5,551,370 A 9/1996 Hwang
5,775,253 A 7/1998 Quan
5,970,639 A 10/1999 Hui
5,975,101 A * 11/1999 Zheng ..................... 135/125
6,119,621 A 9/2000 Johnson
6,491,052 B1 12/2002 Zheng
6,718,670 B2 4/2004 Wang
6,857,385 B1 2/2005 Chen
6,928,951 B2 8/2005 Huang
6,948,632 B2 * 9/2005 Kellogg et al. ............. 220/9.4
7,201,177 B2 * 4/2007 Anticoli et al. ............ 135/125
2002/0096102 A1 7/2002 Sloot
2003/0218667 A1 11/2003 Williams et al.

FOREIGN PATENT DOCUMENTS

GB 2371322 A * 7/2002

* cited by examiner

*Primary Examiner*—Cassandra Davis
(74) *Attorney, Agent, or Firm*—Paul M. Denk

(57) ABSTRACT

A foldable warning device is described. The warning device includes a container for storage therein, at least one panel attached to the container, and at least one fastener that is adapted to allow repeated engagement and disengagement of the panels to and from the container and each other.

8 Claims, 12 Drawing Sheets

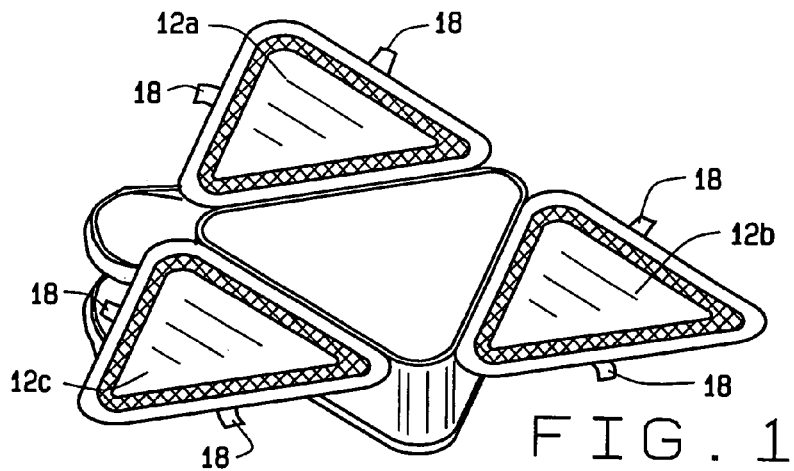
FIG. 10
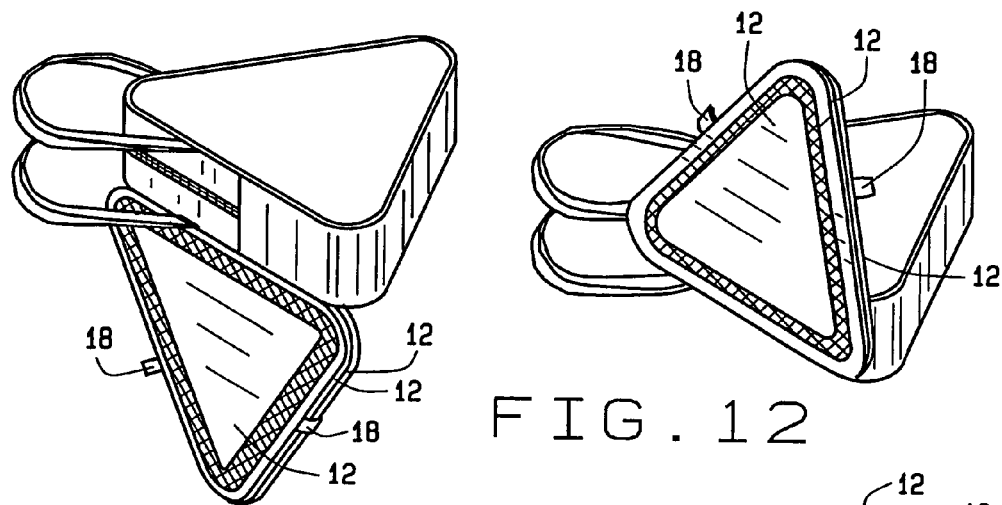
FIG. 11
FIG. 12
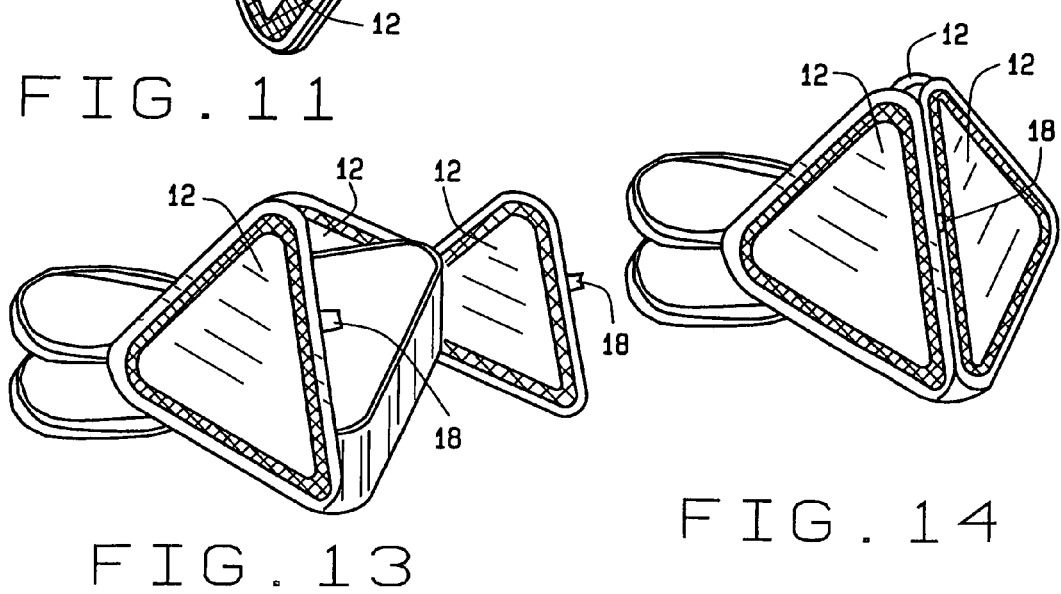
FIG. 13
FIG. 14

US 7,437,845 B2

FOLDABLE CAUTION DEVICE WITH BAG

CROSS-REFERENCE TO RELATED APPLICATIONS

This is a continuation patent application of the continuation-in-part patent application, Ser. No. 10/804,703, filed Mar. 19, 2004 now abandoned which is a continuation-in-part of U.S. patent application Ser. No. 10/449,681, filed Jun. 2, 2003, now U.S. Pat No. 6,928,951 which is incorporated herein by reference.

BACKGROUND OF THE INVENTION

This application relates generally to cautionary devices, such as traffic caution signs, and, in particular, to foldable cautionary devices.

Drivers often have to stop by the side of the road, for example, to change a tire. When the driver gets out of the car, he subjects himself to the danger of being hit by passing cars. Typically, a driver will activate his warning lights, which causes the backlights to blink on and off to inform other drivers that he has stopped. However, depending on lighting conditions, it is sometimes difficult for other drivers to see the warning lights thereby subjecting the driver to risk.

Emergency traffic workers, such as tow-truck drivers, policemen, etc. often place cones behind cars to warn oncoming traffic of the need to be careful. While these devices are more visible than standard vehicle warning lights, the use of such devices is not convenient for typical drivers primarily because there is no convenient place to store such cones in the typical vehicle. Therefore, a need exists for a highly visible warning device that may be conveniently stored in a typical vehicle.

BRIEF SUMMARY OF THE INVENTION

Briefly stated, a collapsible warning device is provided that comprises a container, at least one panel connected to the container and at least one fastener connected to the at least one panel, for repeated engagement and disengagement of the at least one panel to the container and to another panel.

In another aspect of the invention, a collapsible warning device is provided that comprises at least one panel connected to the container and at least one bar adapted to engage the at least one panel and the container to hold the at least one panel in an upright position.

In yet another aspect of the invention, a collapsible warning device is provided that comprises at least one panel, a fastener connected to the panel, and a means for stabilizing the warning device in communication with the warning device.

In a further aspect of the invention, a collapsible warning device is provided that comprises at least two panels connected to each other along a side peripheral edge and at least one fastener adapted to connect the two panels to each other, wherein the panels are adapted to be in a use configuration when connected to each other by the fastener.

BRIEF DESCRIPTION OF THE SEVERAL VIEWS OF THE DRAWINGS

FIG. 7 is a perspective view of an embodiment of the warning device of the invention in an open configuration, wherein the warning panels are each independently connected to the bag;

FIGS. 8-10 are perspective views of the warning device shown in FIG. 7, illustrating conversion of the device from a storage configuration to a use configuration;

FIG. 11 is a perspective view of an embodiment of the warning device of the invention, wherein only one of the warning panels is connected to the bag, and the other warning panels are connected to the first warning panel;

FIGS. 12-14 illustrate the warning device of FIG. 11 being unfolded to its use configuration;

Corresponding reference numerals will be used throughout the several figures of the drawings.

DETAILED DESCRIPTION OF THE INVENTION

Figure 1:
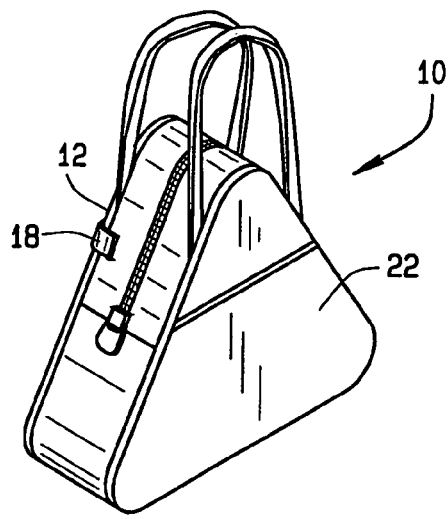
FIG. 1 is a plan view of a triangular warning device of the present invention.
Figure 2:
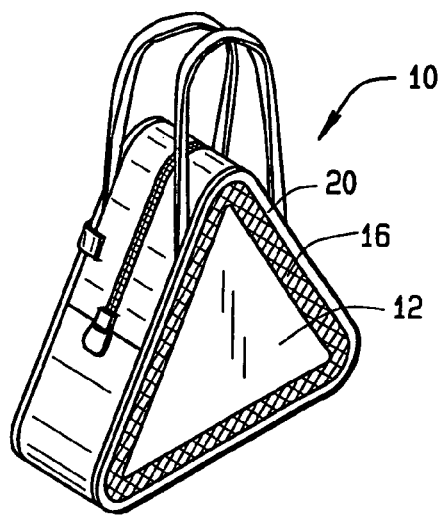
FIG. 2 is a plan view of the triangular warning device of FIG. 1, illustrating the warning panel.

The following detailed description illustrates the invention by way of example and not by way of limitation. This description will clearly enable one skilled in the art to make and use the invention, and describes several embodiments, adaptations, variations, alternatives and uses of the invention, including what is believed to be the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

With reference to the Figures, the warning device 10 of the present invention comprises at least one panel 12 connected to a container 22, and at least one fastener 18, connected to the at least one panel, for repeated engagement and disengagement of the at least one panel to the container and to another panel. In one embodiment, panel 12 has a flexible wire frame and a web 16, which is stretched between the peripheral edges 20 of the frame. Web 16 is preferably made from a material and color, which are easily visible. For example, web 16 is preferably orange or yellow in color because they are often associated with warning signs. Although web 16 is shown to be a net-like material, it will be appreciated that web 16 can be solid or the threads of the web can be closer together. Because the device is foldable, the material from which web 16 is made is generally flexible. In one embodiment, web 16 is a cloth or flexible plastic sheet.

Container 22 may be any container 22 or container and may comprise a handle and/or a means for accessing the inside of container 22, including, but not limited to a zipper or a flap.

Panels 12 are connected to container 22 by any known means, including sewing them onto container 22. Panels 12 are flexible and foldable, and hence, movable from a folded or storage configuration, wherein panels 12 are adapted to lie within the same plane, either adjacent to one another, or parallel to one another, to an expanded, or use configuration, for example, as shown in FIGS. 3-17. Panels 12 may individually be of any shape, including but not limited to triangular, hexagonal, octagonal or square, generally.

In one preferred embodiment of the invention, warning device 10 comprises three panels 12.

Figure 3:
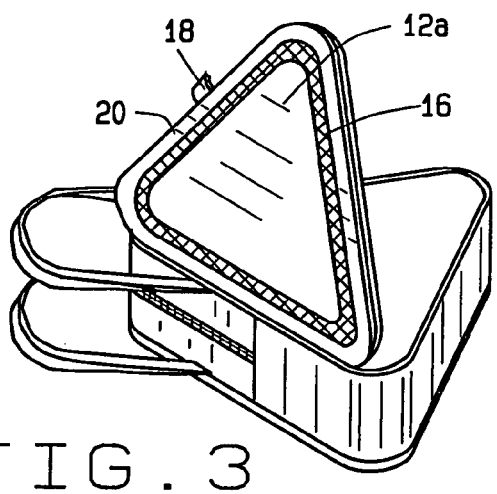
FIGS. 3-5 are perspective views of an embodiment of the warning device of the invention comprising three warning panels, illustrating conversion of the device from a storage configuration to a use configuration.
Figure 4:
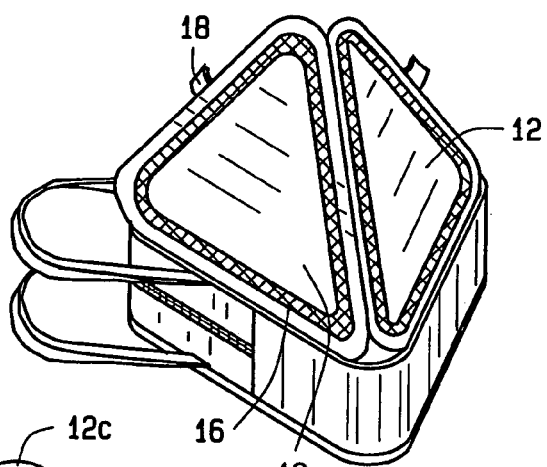
Figure 5:
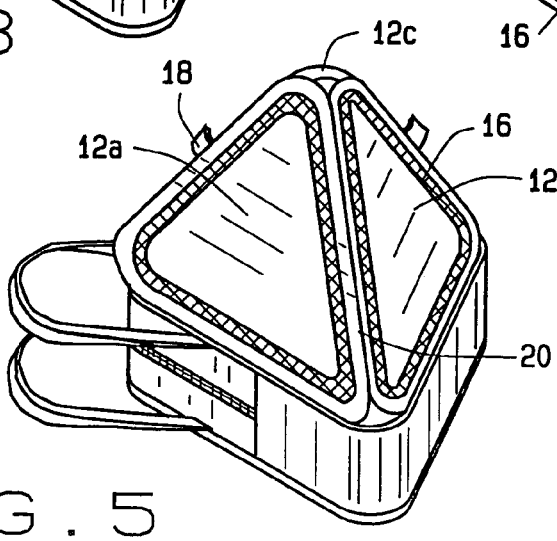
Figure 6:
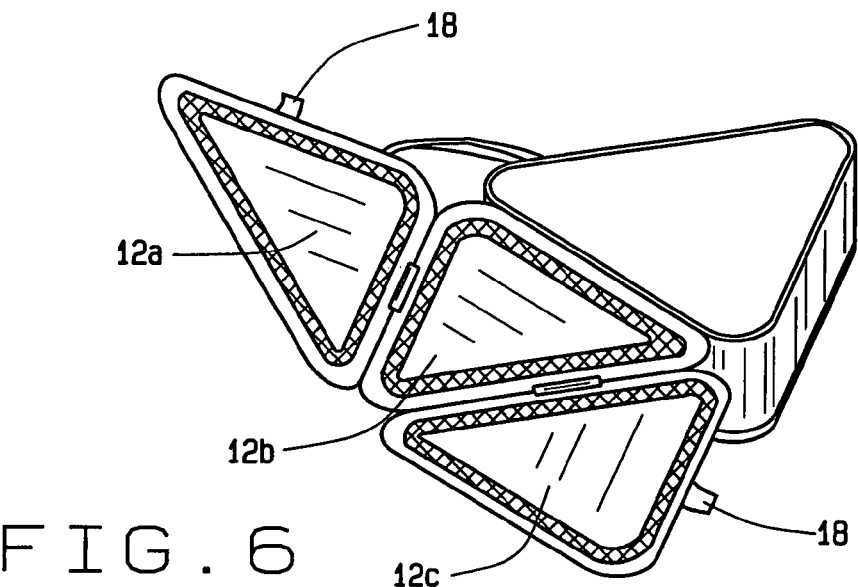
FIG. 6 is a perspective view of an embodiment of the warning device of the invention comprising three warning panels in an open configuration.
Figure 22:
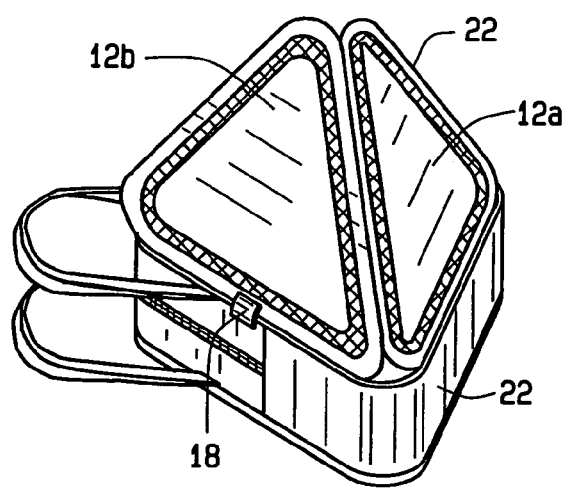
FIG. 22 is a perspective view of one embodiment of the warning device of the invention comprising two warning panels and a hook and loop fastener connecting the panels to each other.

With reference to FIGS. 3-6, and in a specific embodiment of the invention, warning device 10 comprises three panels 12a-c. One panel 12a is connected to container 22 at its bottom edge 20 and the other two panels 12b,c are pivotally connected to the first panel 12 along their side edges 20, such that the three panels 12 define a central panel 12 and two outer panels 12, as illustrated in FIGS. 3-6. When in a use configuration, warning device 10 will form a pyramid as illustrated in FIG. 5. When in a storage position, the panels 12a-c lie adjacent to and generally parallel to one another as seen in FIG. 3. FIG. 22 illustrates an alternative embodiment of the warning device of FIG. 5 comprising at least two panels 12. It should be noted that in specific embodiments of the invention, at least one panel 12 comprises a reflective trim or material.

Figures 7, 8:
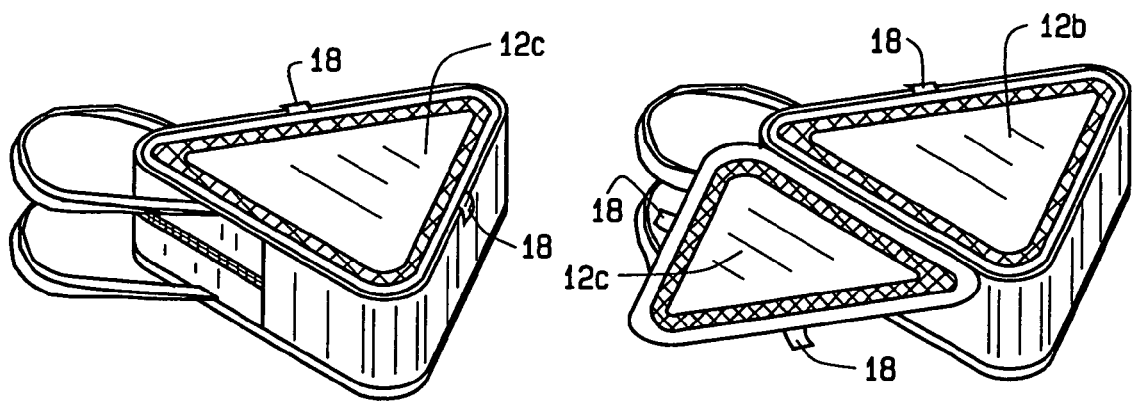
Figure 9:
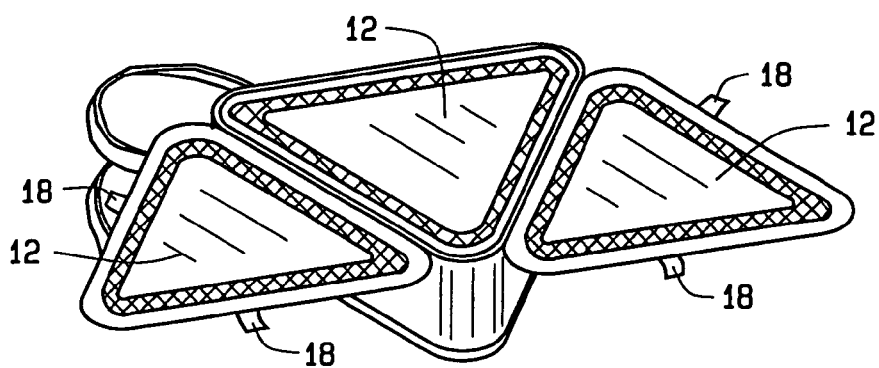

In another embodiment of the warning device illustrated in FIGS. 7-10, the warning device 10 comprises three panels 12a-c, which are individually and operatively connected to container 22 along their bottom edges 20. When in a storage configuration, panels 12a-c are individually connected along their bottom edges 20 to container 22, and are adapted to over lie each other and be generally parallel to container 22. Panels 12a-c are adapted to move from a storage configuration to a use configuration as illustrated in FIGS. 8-10. Panels 12a-c comprise fasteners 18 to support panels in a use configuration. When in a use configuration, each panel 12 is individually unfolded, as illustrated in FIGS. 10, and brought together about their edges 20 to form a pyramid, such as the pyramid illustrated in FIGS. 14 and 15. Fasteners 18 are strapped from one panel 12 onto another panel 12, so that all three panels 12 are removably attached to one another, but permanently attached to container 22. The warning device 12 is converted to a storage configuration by releasing fasteners 18, and folding each panel 12 downwardly to overlie or overlap the container 22.

Generally, when in a storage configuration, fasteners 18 pass from at least panel 12 onto container 22 to hold panel 12 in its storage configuration. In embodiments comprising a plurality of panels, the panels 12a-c are folded on top of the container 22, as illustrated in FIGS. 8 and 9, and fasteners 18 are folded over container 22 to hold panels 12a-c in a storage configuration and parallel to one another and overlying one another. Panels 12, when in this configuration are compact and can be stored in a small space, such as a trunk or automobile seat pocket. When in an upright or "use" configuration, fasteners 18 pass from one panel to another panel (in embodiment FIGS. 7-9) or from the panels to the carrying case (in the embodiment of FIGS. 3-6) to removably stabilize panels 12 in a use configuration.

The at least one fastener 18 may be any fastener 18 capable of removably attaching panel 12 to container 22, or to another panel 12. In one embodiment, fastener 18 is a hook and loop fastener. A suitable hook and loop fastener is commercially available under the trademark Velcro®, from Velcro Industries B.V. in Manchester, N.H. In other embodiments, fastener 18 is a button, snap or any another conventional connector.

Figure 27:
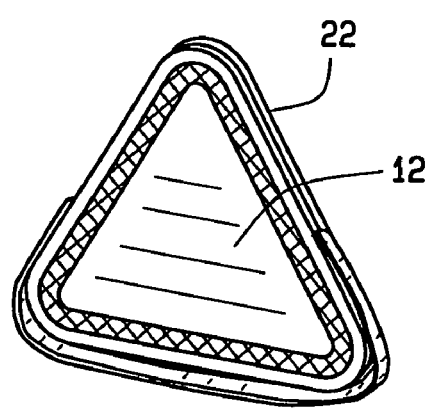
FIGS. 27 and 28 illustrate various embodiments of the warning device comprising reflective screens.
Figure 28:
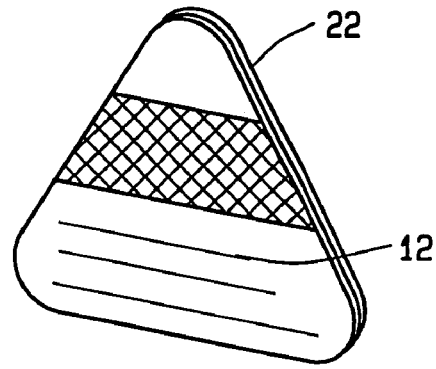

Panel 12 can be made more visible, for example, by including a light-emitting device within the panel, such as a plurality of LED's, or with a strip of reflective material, which extends, for example, about the periphery of panel 12, or about other portions of panel 12, as illustrated in FIGS. 27 and 28. The light-emitting device may also comprise fiber optics, which carry light from a light source. The light-emitting device may be battery operated, and may also comprise a switch to activate the lighting element. Additionally, the panel can be provided with shapes, such as exclamation points or other shapes. Further, the web of the panel need not fill the entire area defined by the frame. For example, the web can be "+" shaped or "Y" shaped, or be in any other desired shape.

Figure 15:
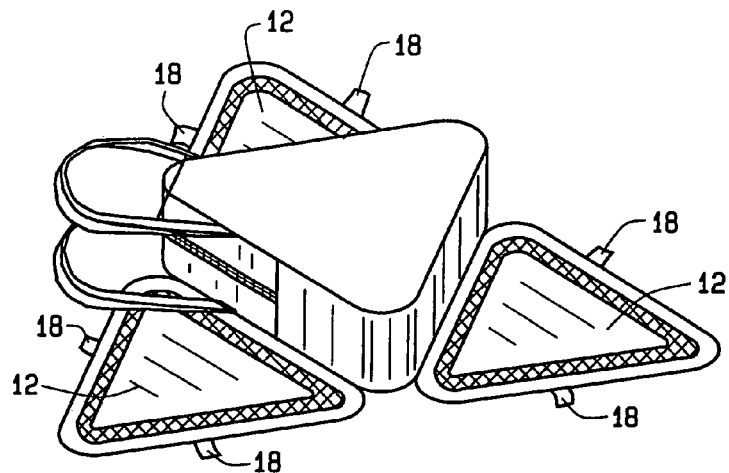
FIG. 15 is a perspective view of an embodiment of the warning device of the invention, wherein each warning panel is connected to the container independently.
Figure 16:
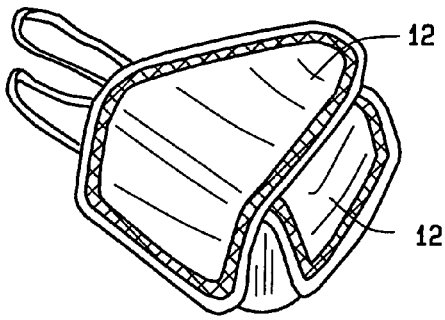
FIG. 16 is a perspective view of the warning device of FIG. 15, illustrating storage of the device.
Figure 17:
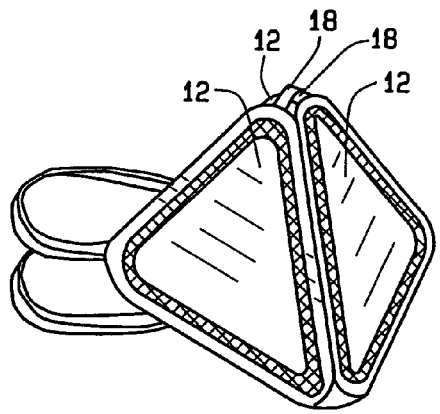
FIG. 17 is a perspective view of the warning device of FIG. 15, illustrating the device in a use configuration.

With reference to FIGS. 11-14, the device 10 may be converted to various use configurations. For example, and in one alternative embodiment of the invention, the device 10 is converted to use a configuration by turning and pulling panels 12 around the container 22, such that container 22 is enclosed by panels 12 as shown in FIG. 14. Fasteners 18 are then used to connect panels 12 and to secure them in a use configuration. With reference to FIGS. 14 and 15, in embodiments where panels 12 are individually connected to container 22, and not to each other, the device may also be brought into a use configuration by pivoting panels 12 around container 22 as seen in FIGS. 15-17, such that container 22 is enclosed by panels 12. Fasteners 18 are used to connect and stabilize panels 12 in the various use configurations.

Figure 18:
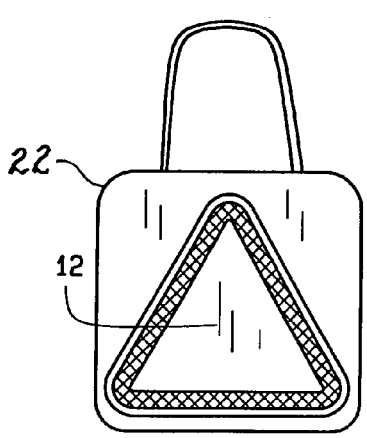
FIGS. 18-20 illustrate alternative embodiments of the warning device of the invention comprising differently shaped containers.
Figure 19:
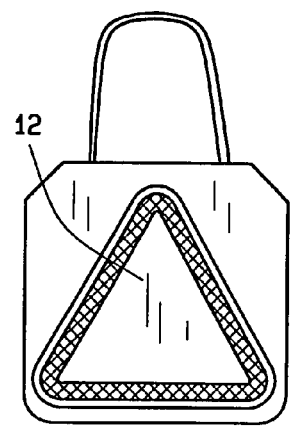
Figure 20:
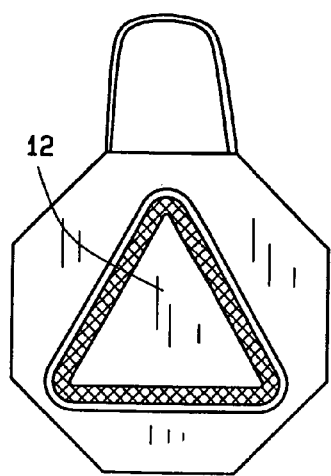

FIGS. 18-20 illustrate alternative embodiments of container 22. Container 22 may be square, as illustrated in FIGS. 18 and 55-57, hexagonal, as illustrated in FIG. 19, oxagonal, as illustrated in FIG. 20, or any other shape not illustrated.

Figure 21:
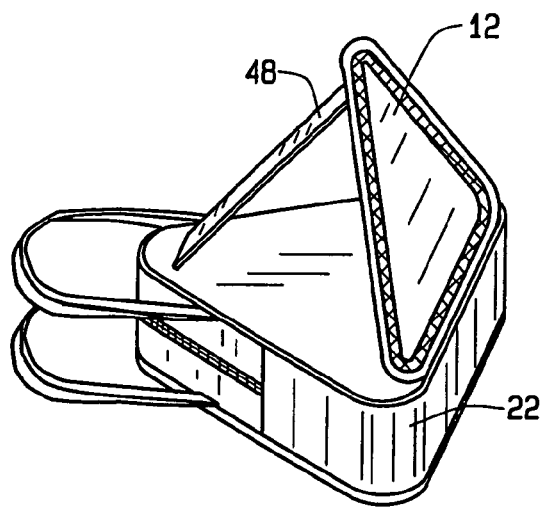
FIG. 21 is a perspective view of one embodiment of the warning device of the invention comprising one warning panel and a bar to hold the panel in a use configuration.
Figure 57:
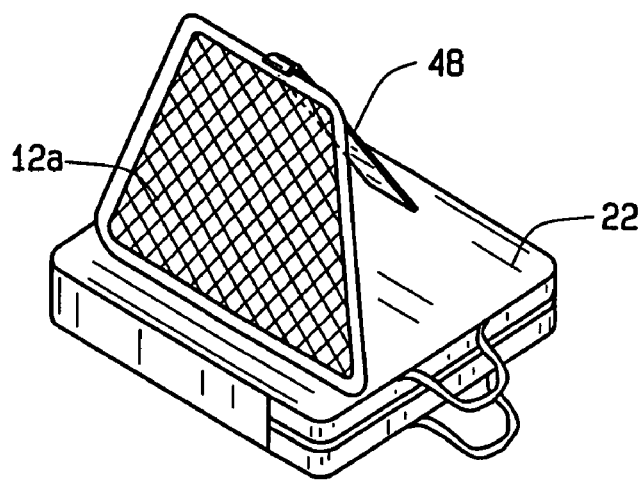
FIG. 57 is an illustration of an alternative embodiment of the warning device of FIG. 55 comprising one panel and a stand.

In one embodiment, container 22 comprises at least one panel 12, which is connected into the container and at least one bar 48. Bar 48 is adapted to engage panel 12 and container 22 to hold panel 12 in an upright position. When in a storage configuration, bar 48 and panel 12 lie on top of one another and in the same plane as container 22. FIG. 21 illustrates one specific embodiment of the caution device of the invention wherein container 22 comprises one panel 12 and one bar 48. When in a storage configuration, bar 48 and panel 12 lie on top of one another and in the same plane as container 22. An alternative embodiment of the warning device of FIG. 21 is illustrated in FIG. 57.

Figure 23:
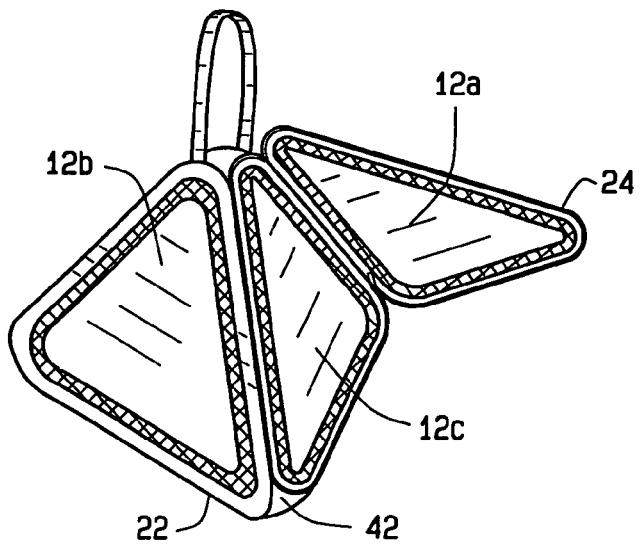
FIG. 23 is a perspective view of one embodiment of the warning device of the invention comprising a zipper and a bottom panel being converted to use configuration.
Figure 24:
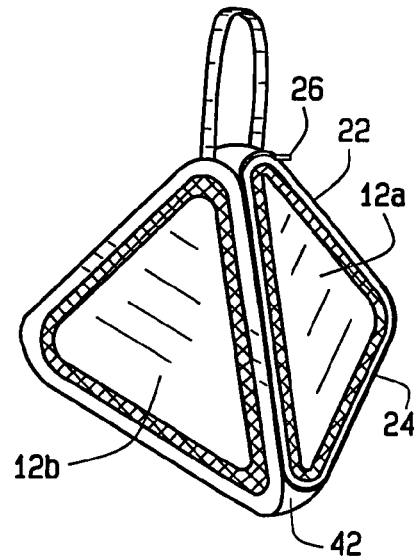
FIG. 24 is a perspective view of one embodiment of the warning device of the invention comprising a zipper and a bottom panel in storage configuration.
Figure 25:
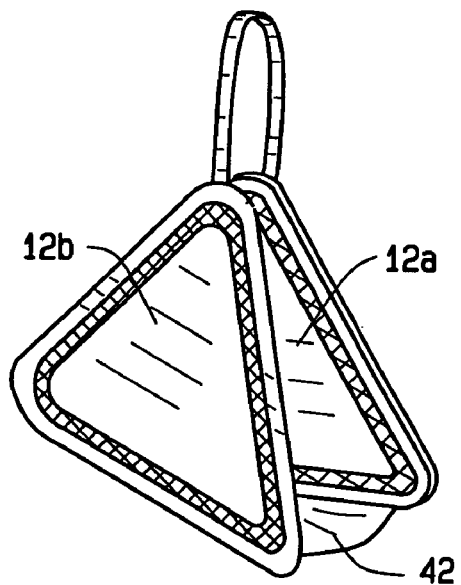
FIGS. 25 and 26 are perspective views of one embodiment of the warning device of the invention comprising a bottom panel, being converted from a use configuration to a storage configuration.
Figure 26:
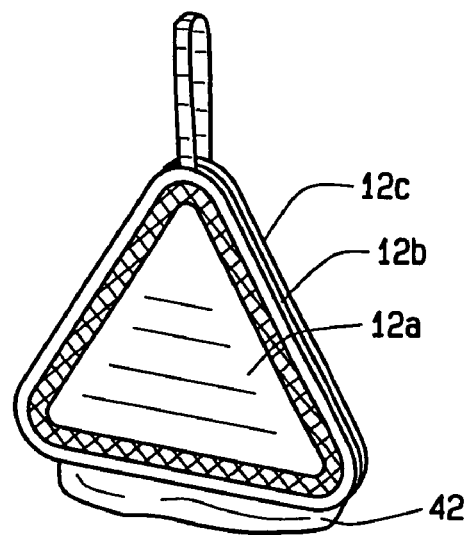

FIGS. 23 and 24 illustrate alternative embodiments of the warning device of the invention. In these specific embodiments, panels 12 are removably attached to container 22 by at least one zipper 26. To attach and detach panels 12, zipper 26 is pulled. In specific embodiments of the invention illustrated in FIGS. 25-28 the warning device of FIGS. 23 and 24 comprise at least one panel 12 that is connected to other panels 12 by a strap 42 that extends from a bottom periphery of one panel 12 to the bottom periphery of another panel 12. The panels 12 may be connected to container 22 such that they lie on top of each other and in the same plane when in a storage configuration, as illustrated in FIG. 26. In specific embodiments, panels 12 comprise reflective material 22 on at least one panel 12.

In one embodiment of the invention, illustrated in FIGS. 29-35, the warning device of the invention comprises at least one panel 12, a fastener 18 connected to the at least one panel 12, and a means for stabilizing the warning device 30 in communication with the warning device. In one embodiment illustrated in FIGS. 29-31, the means for stabilizing the warning device 30 is at least one pocket 30. The pocket 30 generally comprises at least one article 32 having a weight that is greater than the total weight of the at least one panels 12. The at least one article 32 may be any article so long as it has a weight that is greater than the total weight of the at least one panels 12, including but not limited to metal, rubber, sand, water, or any combination thereof.

Figure 29:
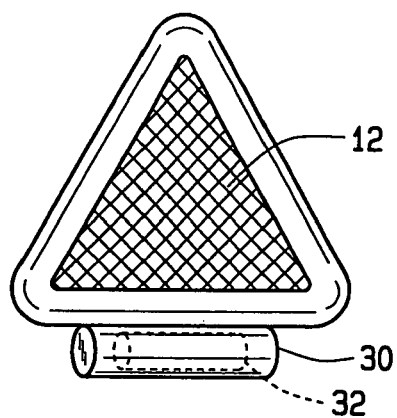
FIG. 29 illustrates one embodiment of the warning device comprising a pocket for carrying a means for stabilizing the warning device.
Figure 30:
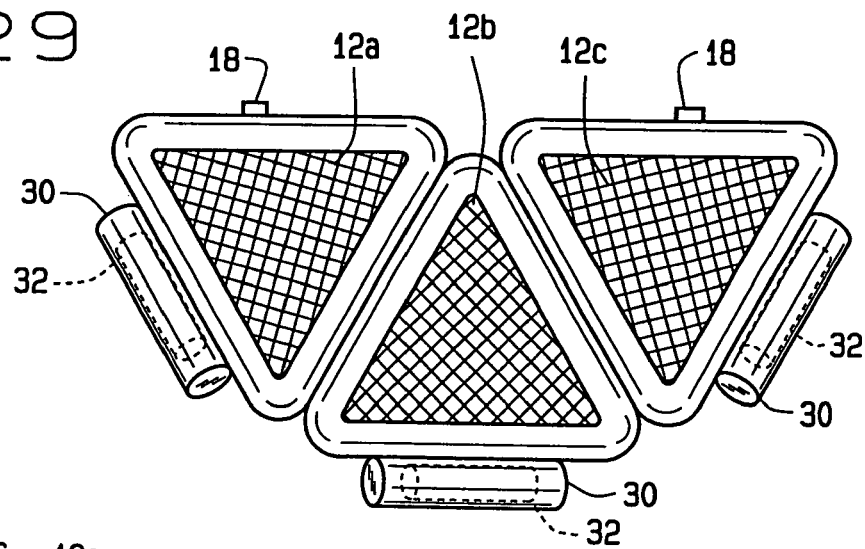
FIGS. 30 and 31 illustrate conversion of the warning device of FIG. 29 from an open configuration to a use configuration.
Figure 31:
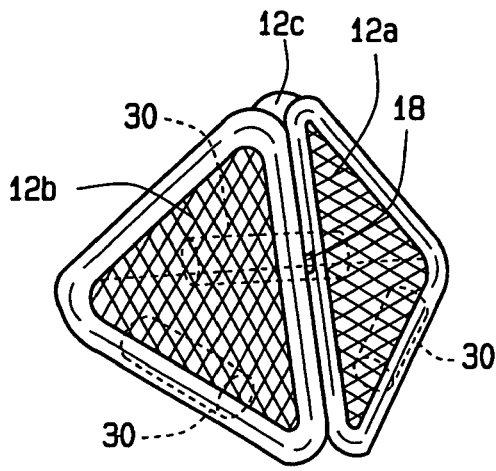
Figure 32:
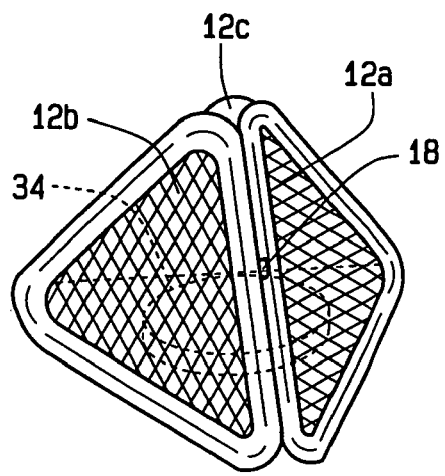
FIG. 32 is a perspective view of one embodiment of the warning device of the invention comprising a means for stabilizing the warning device inside the warning device
Figure 34:
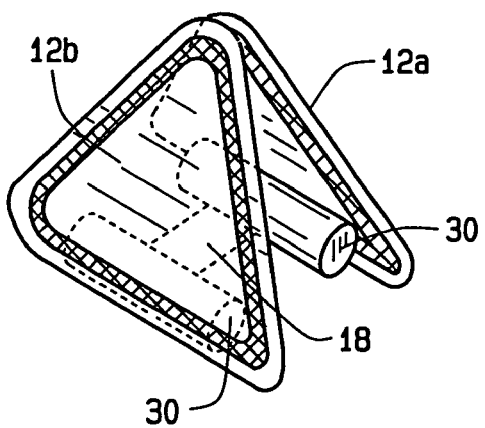
FIG. 34 is a perspective view of one embodiment of the warning device of FIG. 29 comprising two panels.
Figure 35:
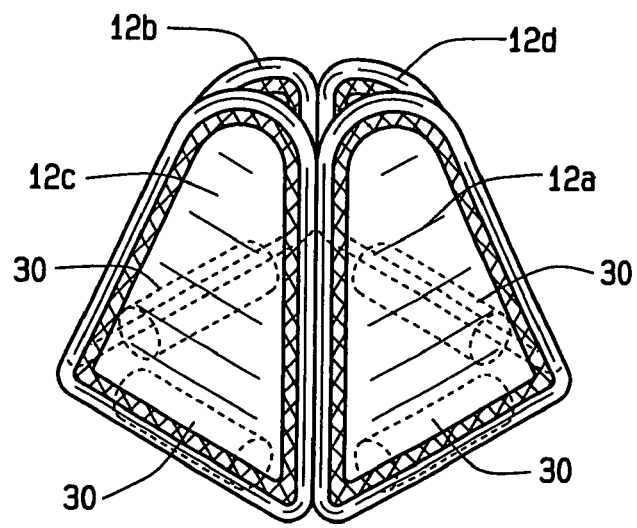
FIG. 35 is a perspective view of one embodiment of the warning device of FIG. 29 comprising four panels.

In certain embodiments of the invention, and with reference to FIGS. 29-31, the means 30 for stabilizing the at least one panel 12 are individually connected to at least one panel 12. However, in one embodiment illustrated in FIG. 32, the means 30 for stabilizing the at least one panel 12 lies within the panels 12. In this specific embodiment, the warning device comprises a strap 42 that extends from a bottom periphery of one panel 12 to a bottom periphery of another panel 12. The means for stabilizing the at least one panel 12 is in communication with the strap 42 when in use configuration. FIGS. 34 and 35 illustrate various embodiments of the warning device of FIG. 29 comprising two panels 12, a strap 42 and means for stabilizing panels 12, and comprising four panels 12 and means for stabilizing the panels 12, respectively.

Figure 33:
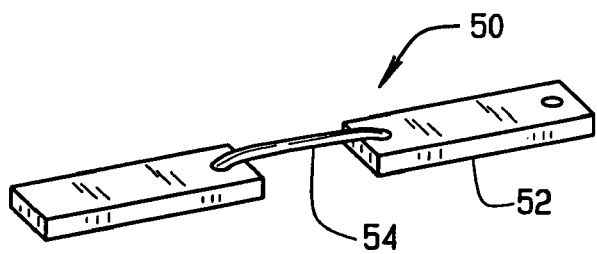
FIG. 33 is an illustration of one means for stabilizing the warning device of the invention.

FIG. 33 illustrates a connector 50 for attaching panels 12 to each other.

Figure 36:
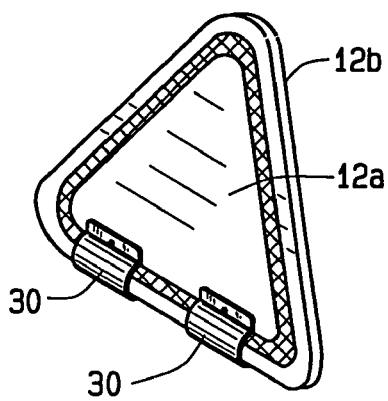
FIGS. 36 and 37 are perspective views of alternative embodiments of the warning device of the invention, wherein the pockets hook on to the panels.
Figure 37:
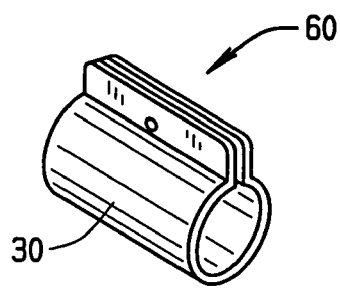

With reference to FIGS. 36 and 37, and in one embodiment of the invention, the pocket 30 of the invention is removable. FIGS. 33 and 37 illustrate a clamp 60 useful for attaching the pocket 30 to the panels 12. FIG. 36 illustrates use of clamp 60. When in use clamp 60 simply clips or clamps the pocket 30 onto the panel 12. Clamp 60 may be made of any material including metal, rubber, plastic, a magnetic material, or any combination or mixture thereof.

Figure 42:
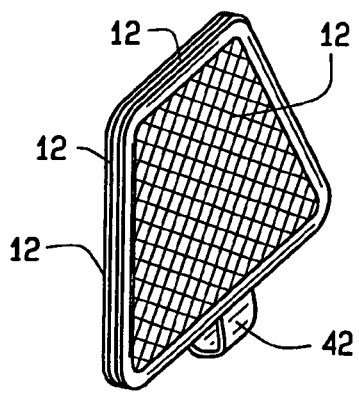
Figure 43:
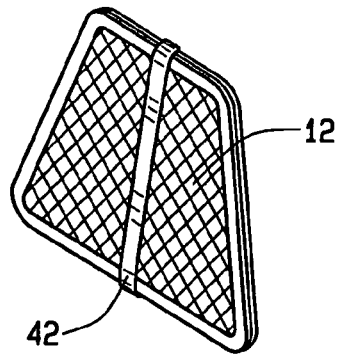

In one embodiment of the invention, the collapsible warning device of the invention comprises at least two panels 12 connected to each other along a side peripheral edge and at least one fastener 18 adapted to connect the at least two panels 12 to each other. Panels 12 are adapted to be in a use configuration when connected to each other by the at least one fastener 18. In a specific embodiment, the fastener 18 is a hook and loop fastener. Panels 12 are adapted to lie on top of one another and within the same plane when in a storage configuration, as illustrated in FIGS. 42 and 43. Strap 42 may be utilized to maintain panels 12 in a storage configuration, as illustrated in FIG. 43.

Figure 38:
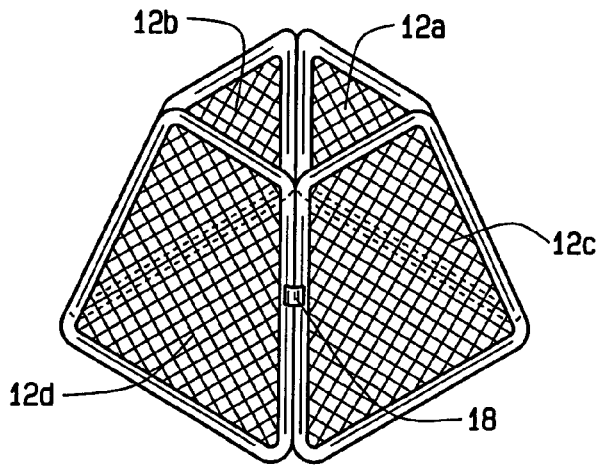
FIG. 38 is a perspective view of one embodiment of the warning device of the invention comprising four panels.
Figure 39:
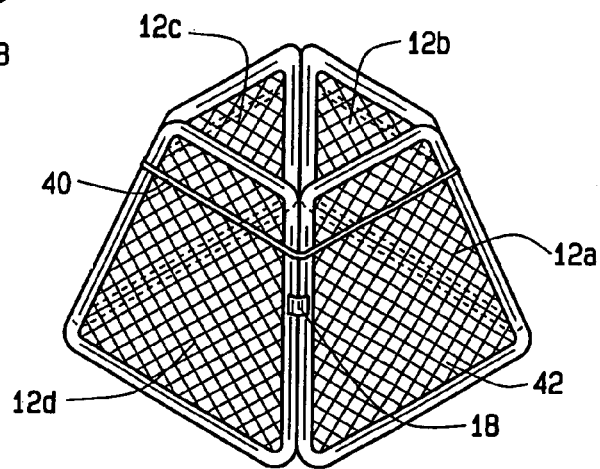
FIG. 39 is a perspective view of an alternative embodiment of the warning device of FIG. 38 comprising a sleeve.
Figure 40:
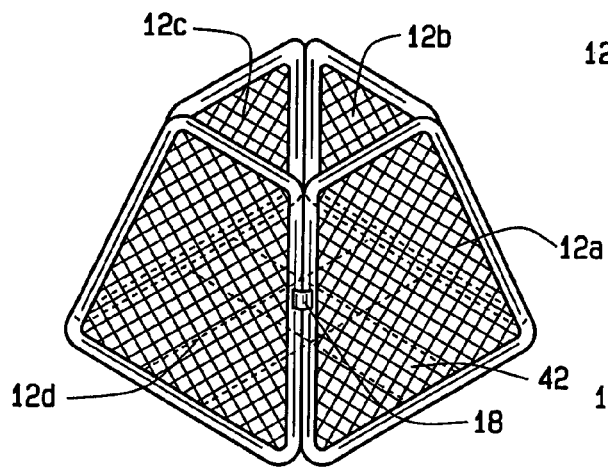
FIG. 40 is a perspective view of an alternative embodiment of the warning device of FIG. 38 comprising a bottom panel.

In one embodiment of the invention, illustrated in FIG. 38, the warning device comprises four panels 12. In another embodiment of the invention illustrated in FIG. 39, the warning device comprises at least one sleeve 40, which is adapted to impart some stability to the warning device. Sleeve 40 is simply slid over the top edge of the panels 12 when in an upright configuration and placed in communication with the panels 12. In yet another embodiment of the invention illustrated in FIG. 40, the warning device comprises at least one strap 42 (described above). Straps 42 may be perpendicular to each other as illustrated in FIG. 40, but may also be a single strap 42 that is in communication with a bottom peripheral edge of every panel 12 as illustrated in FIG. 39.

Figure 41:
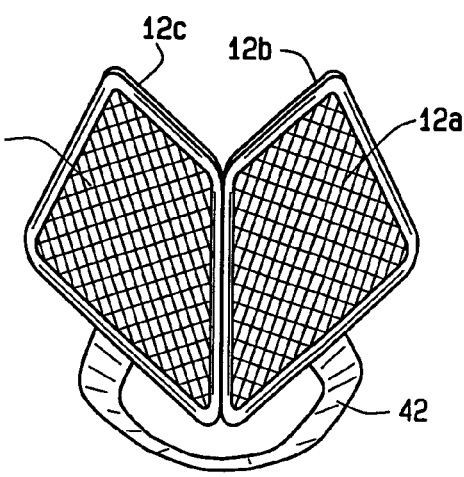
FIGS. 41-43 illustrate alternative embodiments of the warning device of FIG. 40.
Figure 45:
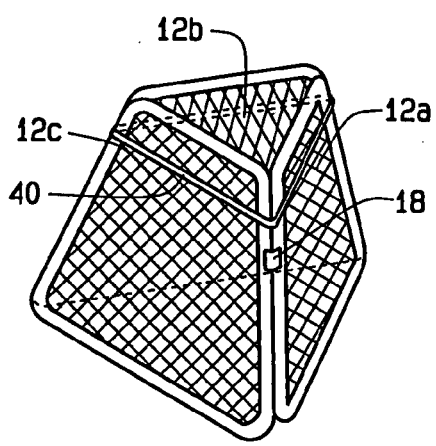
FIG. 45 is an illustration of an alternative embodiment of the warning device of FIG. 44 comprising a sleeve.
Figure 44:
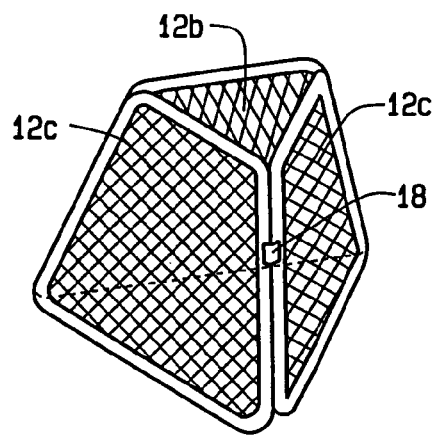
FIG. 44 is a perspective view of one embodiment of the warning device of the invention comprising three panels.
Figure 47:
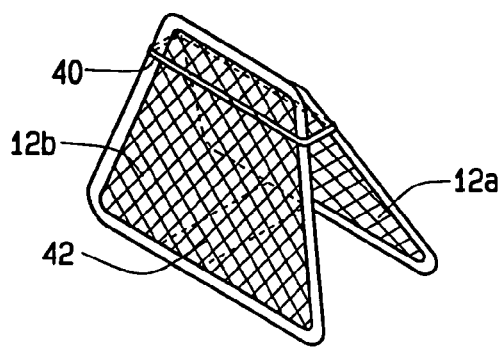
FIG. 47 is a perspective view of an alternative embodiment of the warning device of FIG. 46 comprising a sleeve.
Figure 46:
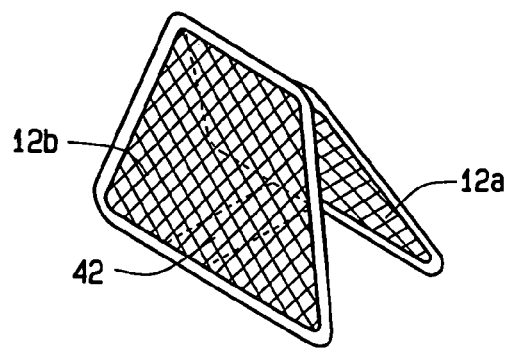
FIG. 46 is a perspective view of an alternative embodiment of a warning device comprising three panels.
Figure 48:
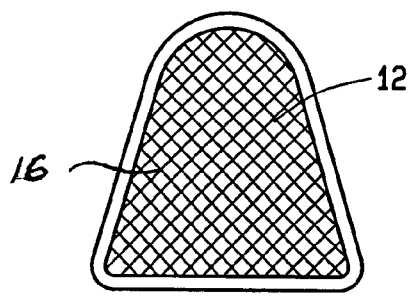
FIGS. 48-53 are illustrations of alternative embodiments of the warning device of FIG. 44 wherein the panels are of various shapes.
Figure 49:
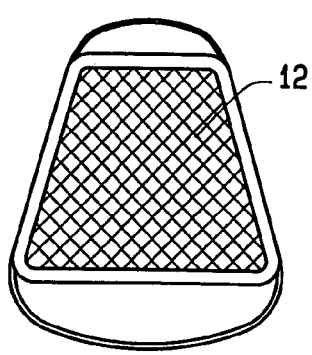
Figure 50:
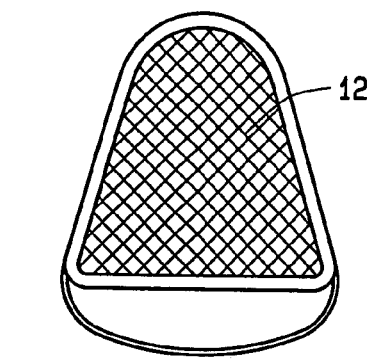
Figure 51:
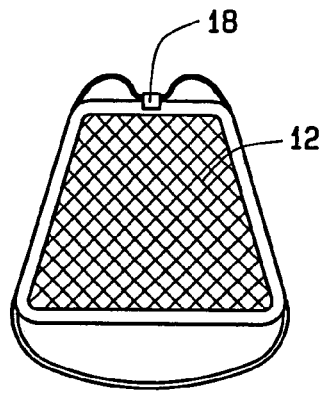
Figure 52:
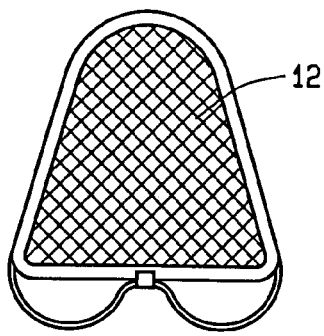
Figure 53:
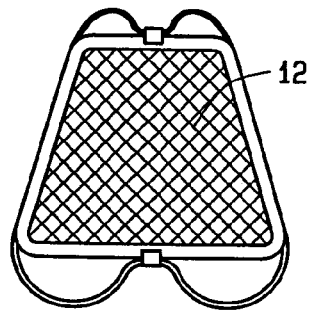
Figure 54:
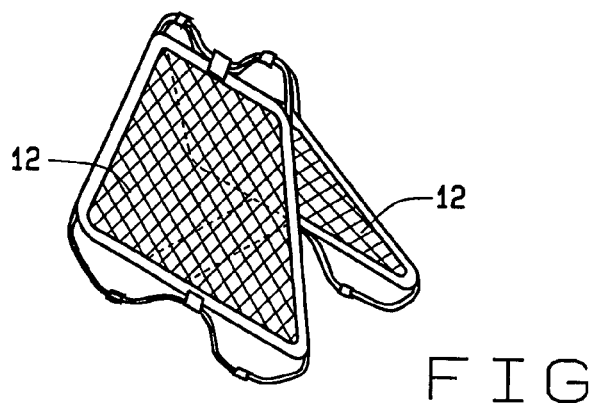
FIG. 54 is a perspective view of one embodiment of the warning device of the invention wherein two panels are sewn together and the two panels are connected by a bottom strap.

In specific embodiments of the invention, the warning device comprises two panels 12 and a single strap 42, as illustrated in FIGS. 41, and 46, and three panels, without sleeve 40 and with a sleeve, as illustrated in FIGS. 44 and 45, respectively. The panels 12 may be connected at any point, including a side peripheral edge, for example as illustrated in FIGS. 44 and 45, or along an upper peripheral edge. Strap 42 generally extends between at least two panels 12, connected to each of their bottom peripheral edges. In accordance with the invention, strap 42 may be adapted for repeated engagement and disengagement with at least one of the panels 12.

In a specific embodiment of the invention, the warning device comprises at least one panel that comprises a flexible wire frame and a web applied to the frame, wherein the web is applied to the frame by a channel at a periphery of the web and through which the wire frame extends. With reference to FIGS. 48-54, panel 12 may comprise webs 16 and wire frames of various shapes. In other embodiments of the invention illustrated in FIGS. 49 and 52, panel 12 comprises two wire frames that individually form an arc about a top or bottom portion and a bottom portion of the panel 12. In another embodiment of the invention illustrated in FIG. 50, panel 12 comprises one wire frame that forms an arc about the bottom portion of panel 12. In another embodiment of the invention illustrated in FIG. 51, panel 12 comprises a wire frame that forms an arc about the bottom portion of panel 12 and a wire frame that forms at least two arcs about the top portion of panel 12. In still another embodiment of the invention, panel 12 comprises two wire frames that each form at least two arcs about the top and bottom portions of panel 12. The warning devices illustrated in FIGS. 49-54 are supported by the arcs formed, when in use configuration.

Figure 55:
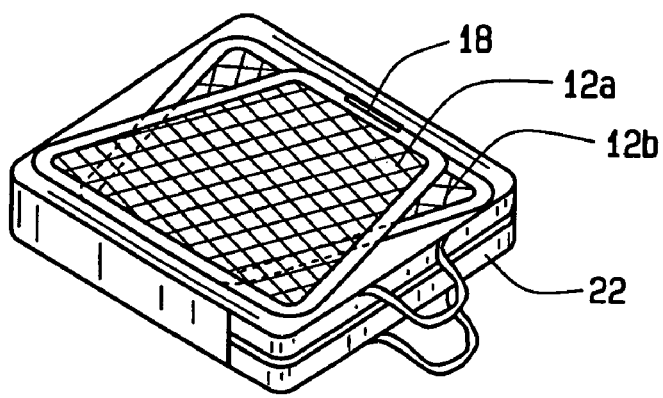
FIG. 55 is a perspective view of one embodiment of the warning device of the invention comprising two panels and a bag.
Figure 56:
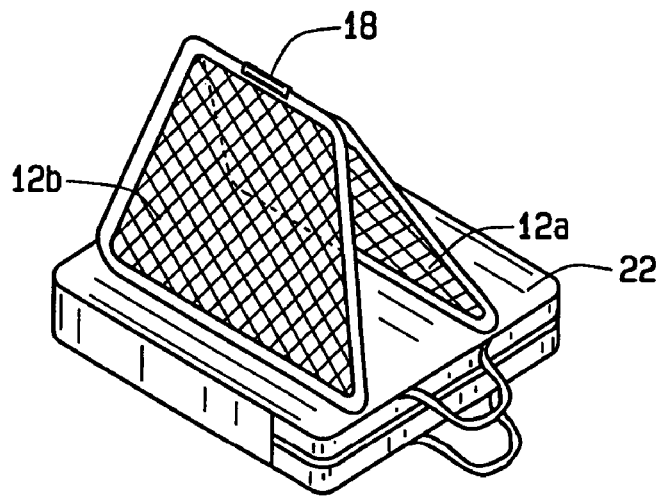
FIG. 56 is an illustration of the warning device of FIG. 55 in use configuration.

FIGS. 55-57 illustrate conversion of one embodiment of the warning device of the invention from a storage configuration wherein panels 12 and bar 48, where applicable, lie in the same plane as container 22, to a use configuration wherein panels 12 and bar 48 are upright.

As various changes could be made in the above constructions without departing from the scope of the invention, it is intended that all matter contained in the above description or shown in the accompanying drawings shall be interpreted as illustrative and not in a limiting sense.

The invention claimed is:

1. Collapsible warning device comprising at least one panel, a container, a fastener connected to the at least one panel, and said fastener being at the bottom edge of the at least one panel being sewn to the container;
    said collapsible warning device comprising three panels and three means for stabilizing the warning device individually connected to each of the three panels, the panels being operatively connected together along a side peripheral edge thereof, and being moveable between a first storage position in which said panels are substantially parallel to each other and to a face of the container, and a second position in which said panels are adjacent each other at their top peripheral edges and spaced apart from each other at their bottom edges to define a triangular pyramid.

2. The warning device of claim 1 wherein the at least one panel comprises reflective material.

3. The collapsible warning device of claim 2 comprising three panels.

4. The collapsible warning device of claim 1 wherein select panels have reflective material upon the periphery.

5. A collapsible warning device comprising: a container:
    a pair of panels, one of said panels being connected to the container, and each panel being formed of at least one of cloth and flexile plastic formed of a mesh, cloth, or sheet material, each panel having a flexible wire frame around its perimeter to hold the panels in their erected form;
    at least one fastener connected to one of the panels, for repeated engagement and disengagement of the at least one panel to the container;
    whereby the panels may be erected upon the container, or removed for independent usage, as a warning device; and
    wherein a bottom edge of at least one of the panels is secured by the fastener to the container, and the fastener is sewn onto the container.

6. The collapsible warning device of claim 5 wherein there are at least two panels, and the at least two panels have a shape that is one of triangular, hexagonal, octagonal or square.

7. The collapsible warning device of claim 6 wherein the at least two panels are adapted to lie in the same plane when in a storage configuration.

8. A collapsible warning device comprising:
    a container:
    a pair of panels, one of said panels being connected to the container, and each panel being formed of at least one of cloth and flexible plastic formed of a mesh, cloth, or sheet material, each panel having a flexible wire frame around its perimeter to hold the panels in their erected form;
    at least one fastener connected to one of the panels, for repeated engagement and disengagement of the at least one panel to the container; and
    whereby the panels may be erected upon the container, or removed for independent usage, as a warning device.

* * * * *